No. 639,351. Patented Dec. 19, 1899.
G. P. BRUBAKER.
SPLIT PULLEY.
(Application filed June 23, 1899.)
(No Model.)

Witnesses

George P. Brubaker, Inventor.
By his Attorney

UNITED STATES PATENT OFFICE.

GEORGE P. BRUBAKER, OF BERLIN, PENNSYLVANIA.

SPLIT PULLEY.

SPECIFICATION forming part of Letters Patent No. 639,351, dated December 19, 1899.

Application filed June 23, 1899. Serial No. 721,627. (No model.)

*To all whom it may concern:*

Be it known that I, GEORGE P. BRUBAKER, a citizen of the United States, residing at Berlin, in the county of Somerset and State of Pennsylvania, have invented a new and useful Split Pulley, of which the following is a specification.

My invention relates to improvements in split wood pulleys; and the objects in view are to improve the construction of pulleys of this class with a view to facilitating the application of the device to a shaft without disturbing the latter, to provide for the free circulation of air through the pulley bridge-trees, and thus reduce the air-resistance on the pulley, with a consequent economy of power, and to provide for the adjustment of the pulley to compensate for contraction of the metallic shaft under atmospheric changes, to the end that the pulley may be bound firmly on the shaft under abnormal conditions.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1:
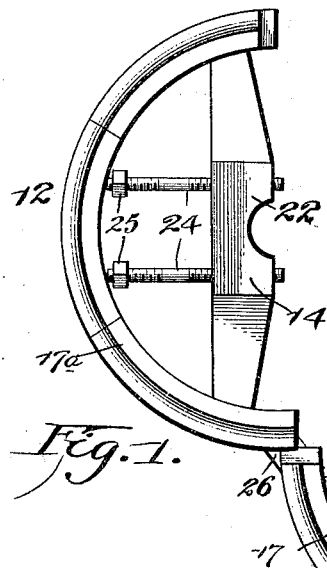
Figure 5:
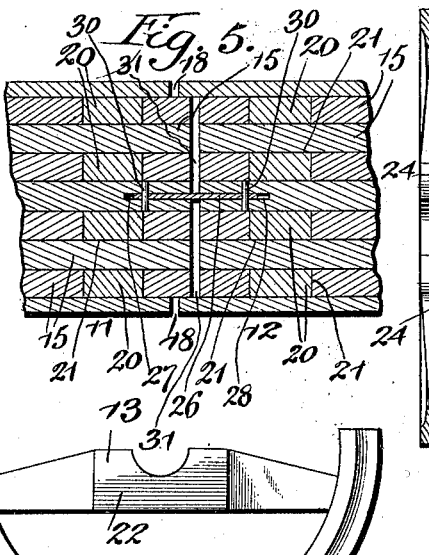
Figure 3:
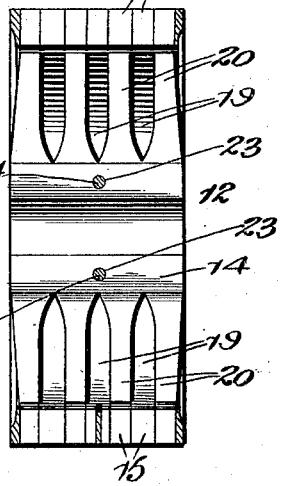
Figure 2:
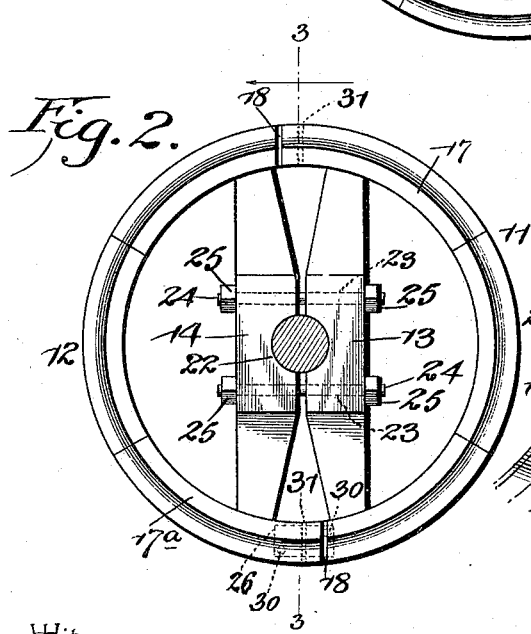
Figure 4:
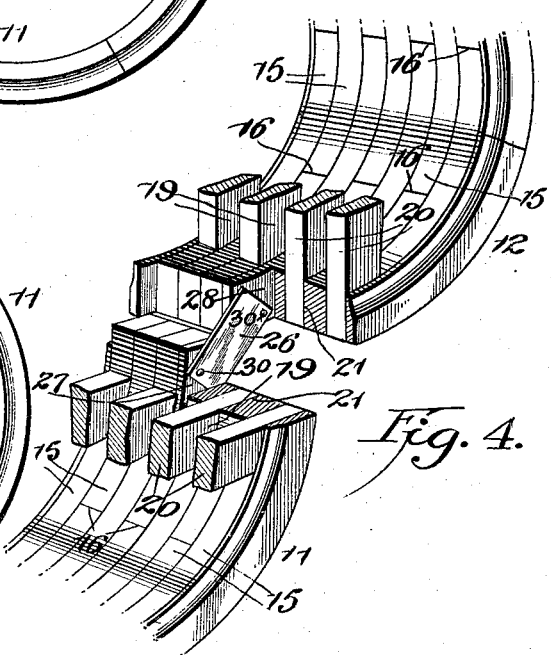

Figure 1 is a side elevation of a wood pulley embodying my invention with the hinged sections thereof opened to facilitate application to a shaft. Fig. 2 is a side elevation with the pulley members assembled and applied to a shaft, showing the link-hinge by dotted lines. Fig. 3 is a vertical transverse section through the pulley on the plane indicated by the dotted line 3 3 of Fig. 2, looking in the direction indicated by the arrow. Fig. 4 is an enlarged detail view illustrating the construction of the pulley members and the hinge-joint between said members. Fig. 5 is a detail cross-section of the parts shown by Fig. 4.

The same numerals of reference are used to indicate like and corresponding parts in each of the several figures of the drawings.

The wood pulley of my invention consists in the complemental sections or members 11 12 and the bridge-trees 13 14 which are united to the respective members, within the terminals thereof, so as to lie parallel with each other, or substantially so, when the parts are assembled together for application to a shaft. Each section of the pulley is a laminated structure, composed of segmental pieces 15, assembled laterally together in overlapping relation and with the parts arranged to break joint at 16. In making each member or section of the pulley the segmental pieces 15 thereof are arranged compactly together for union laterally by cement, glue, or other suitable mucilaginous substances, and said pieces are disposed to present the grain thereof to the face of the pulley, as is common and ordinary in this art. Each member or section of the pulley is provided on its opposite sides with face plates or strips 17 17ª, and said plates or strips at the meeting ends of the pulley-sections are constructed to overlap and break joint, as at 18, thus making the face of the pulley, at the edges thereof, practically flush and continuous. The bridge-trees 13 14 are made fast, respectively, with the pulley members 11 12, and each bridge-tree is a single piece of material, preferably wood.

One of the important features of my invention is the construction of each bridge-tree in a manner to provide for the circulation of air therethrough in order to reduce the air-resistances to the rotation of the pulley and also to enable the ends of the bridge-tree to be built into one pulley member, so as to form an integral and indivisible part thereof. In attaining this part of the invention I construct each bridge-tree with a plurality of longitudinal slots 19 on each side of the hub portion of the tree—that is to say, a series of parallel slots 19 are formed in each end of the bridge-tree to extend from a line adjacent to the hub portion to and through the end of the tree itself. This division or slotting of the bridge-tree provides a plurality of arms 20, which serve to divide or separate the slots, and said arms 20, at the ends of the bridge-tree, are received in spaces or sockets 21, which are provided in each pulley member, near the ends thereof. In other words, the rim of the pulley-section is built into and around the separated arms of the bridge-tree. It will thus be seen that the bridge-tree is united permanently to and forms a part of the rim, so that each section or member of the pulley consists of a bridge-tree and the segment of the rim, and the ends of the arms 20, forming a part of the bridge-tree, are flush with the face of the rim-section, as clearly shown by Fig. 1.

The bridge-trees 13 14 of the pulley members are enlarged at the middle portions thereof and recessed in opposite directions to form the hub 22, adapted to fit the shaft, and said bridge-trees are further provided at points between the shaft-opening and the longitudinal slots 19 with transverse bolt-passages 23, which are adapted to receive the clamping-bolts 24, each bolt having nuts 25 screwed on the threaded ends thereof.

It is common in the art of making wood pulleys to divide or split the pulley transversely entirely through the rim thereof, thus leaving the pulley in two separable and independent sections, which are joined together only by the devices that serve to clamp the pulley upon the shaft; but practical experience with pulleys in which the rims of the sections are disconnected has demonstrated the fact that it requires considerable time and the services of two or more men to properly assemble and fasten such a divided pulley to a shaft, particularly in the case of heavy shafting and large pulleys. One of the chief ends which I aim to accomplish is the expeditious application of a wood split pulley to a shaft, and in attaining this end I contemplate connecting the pulley members permanently together on one side only by means of a link-hinge, which is set into the adjacent ends of the pulley members, so as to lie flush or within the face of the rim, and which link-hinge permits the other ends of the two members to be opened to a sufficiently wide extent for easily slipping the pulley, when opened, around the shaft in order to facilitate the application and fastening of the pulley to the shaft. The link-hinge 26 which I prefer to employ consists of a plate which has its opposite ends fitted in kerfs or recesses 27 28, formed in the contiguous ends of the two pulley-sections, on one side thereof. The kerfs 27 28 are formed in the middle of the rim-sections forming a part of the pulley members, and the link-hinge plate 26 has its ends fitted in these kerfs or recesses, so as to lie within the faces of the rim-sections, thus compactly disposing the hinge-plate and practically concealing the same within the pulley-rim to prevent the hinge-plate from coming in contact with the belt, which traverses the pulley-rim. As the members of the pulley must be drawn inwardly toward each other at their meeting ends in order to permit the bolts to clamp the pulley-hub upon the shaft, and as the rim-sections should lie practically flush with one another when the pulley is tightened, I find it advantageous to connect the link-hinge plate to the meeting ends of the pulley-sections, on one side thereof, in a manner which will not only permit the members to approach one another, but which also enables the pulley members to be thrown wide open to the extent shown by Fig. 1, in order to facilitate the application of the divided pulley to the shaft. I therefore purpose to connect the hinge-plate 26 at its diagonally opposite corners to the meeting ends of the respective pulley members, and the connection between the diagonally opposite corners of the plate 26 and the pulley members is effected by means of pivot pins or bolts 30, which are secured in the laminated pulley members and pass through the plate, near the corners thereof, as clearly shown by Figs. 4 and 5. The employment of the link-hinge plate between one side of the pulley members and the attachment of said plate in the manner described to said pulley members permit either of the pulley members to be turned to a position where its connected edge will lie in a plane at right angles to the plane of the corresponding edge of the other pulley member, as shown by Fig. 1, and this adaptation of the divided pulley enables the attendant to readily place the pulley around the shaft. After the pulley shall have been slipped into position, with the bridge-tree of one member in engagement with the shaft, the other member may be turned on the link-hinge plate to bring its end faces opposite to and parallel with the corresponding end faces of the applied pulley-section. This adjustment brings the bridge-tree on the movable pulley member into position to engage with the shaft and for the bolt-holes 23 therein to register with corresponding bolt-holes in the applied pulley-section, and the bolts may thus be passed through the coincident openings 23, after which the nuts 25 should be tightened in order to draw the bridge-trees of the two members into firm engagement with the shaft, thereby clamping the pulley firmly in position on said shaft.

In the practical construction and service of divided pulleys it has heretofore been customary to assemble the members of the pulley for the rim-sections thereof to have abutting relation and engagement in order to make the rim continuous and flush at the joints when the pulley members are firmly clamped to the shaft. It has been found that under abnormal weather conditions, as during the prevalence of severe cold weather, the shaft will contract somewhat, and thus the pulley will slip thereon, because there is not provision made for adjustment of the pulley members by the the clamping devices, owing to the fact that the rim-sections abut solidly together in order to make flush and close joints on the face of the pulley, and if the clamping devices are drawn together beyond the limits provided for under the normal conditions of service the abutting rim-sections will have a tendency to bow or force the bridge-trees laterally. Hence the pulley cannot obtain the necessary purchase on the shaft to make said pulley fast with said shaft. In my invention I overcome this objection by providing narrow spaces or openings 31 between the contiguous ends of the pulley members and proportion the bridge-trees so that they may be applied to a shaft in a manner to secure lateral spacing of said bridge-trees. The bolts are adapted to draw the bridge-trees toward each other in order to make the hub portions grip the shaft, without, however, bringing the bridge-trees into contact or making the end faces of the rim-sections abut together, thus leaving the narrow spaces or openings 31, which, however, do not interfere with the travel of the belt, and should the shaft shrink during the cold weather it is only necessary for the operator to tighten the nuts on the bolts for drawing the bridge-trees firmly into engagement with the shaft to make the pulley fast thereon.

In my improved pulley I employ bolts which are threaded at both ends thereof, and each bolt is provided with nuts which are screwed on the respective ends. This construction of bolts permits them to be inserted into one bridge-tree when the pulley is opened, as shown by Fig. 1, after which the nuts may be screwed on one end of the bolts. Subsequent to the closure of the pulley around the shaft the bolts pass through the bridge-trees of both sections, and the nuts may be screwed on the other ends of the bolts, so that the nuts on both ends of the bolts may be tightened to draw the bridge-trees firmly upon the shaft.

In the application of the face plates or strips 17 or 17ª to the pulley-sections I arrange the strips 17 on the pulley member 11, so as to have one end of the strips extend beyond one end of the rim-section, while the other end of the strips or plates 17 terminate within the corresponding end of the pulley-section. The face plates or strips 17 of the pulley-section 12 are likewise disposed to the rim of said pulley-section, and in the assemblage of the two pulley-sections the extended ends of the rims fit into the recesses of the complemental sections, thus disposing the edges of the pulley-sections practically flush with each other.

Changes in the form, proportion, size, and the minor details of construction within the scope of the appended claim may be resorted to without departing from the spirit or sacrificing any of the advantages of this invention.

Having thus described the invention, what I claim is—

1. A divided pulley consisting of sections which are permanently and pivotally connected on one side of the pulley, and clamping devices for drawing the pulley-sections into coincident relation and firmly upon a shaft, whereby the pulley-sections may be thrown open on their pivotal connection for application to a shaft without disconnecting the members thereof, substantially as described.

2. A divided pulley consisting of complemental members and a pivotal link-hinge permanently connecting said members together on one side of the pulley and arranged flush or within the faces of the pulley-rim, in combination with clamping devices adapted to draw the pulley members firmly upon a shaft, substantially as described.

3. A divided pulley consisting of complemental members provided with coincident kerfs or recesses in the contiguous ends thereof on one side of the pulley and a link-hinge housed within the recessed ends of the pulley to permanently connect the members on one side of the axial line of the pulley, said link-hinge being disposed within the recessed ends of the pulley, in combination with clamping devices for drawing the pulley-sections firmly upon a shaft, substantially as described.

4. A divided pulley consisting of complemental members and a link-hinge plate pivoted at its diagonally opposite corners to the contiguous ends of said sections on one side of the axial line of said pulley and serving to permanently unite the two members while permitting lateral separation thereof for expeditious application to the shaft, combined with clamping means for making the pulley members fast with a shaft, substantially as described.

5. A divided pulley consisting of complemental members having recesses in their contiguous ends and on one side of the axis of the pulley, and a link-hinge plate fitted in said recesses to lie within the faces of the pulley-sections and pivotally connected thereto at its diagonally opposite corners for permitting lateral separation of said pulley-sections without disconnecting the same, combined with clamping devices for making the pulley fast with a shaft, substantially as described.

6. A divided wood pulley consisting of complemental laminated sections, one-piece bridge-trees each having longitudinal slots at its opposite ends forming a series of arms which are spaced apart and have their extremities embedded in the laminated sections, and clamping devices connecting the bridge-trees, substantially as described.

7. A divided wood pulley consisting of complemental sections having the face plates or strips extending beyond their respective sections to form overlapping joints at the contiguous ends of said sections, bridge-trees fast with the respective sections, and clamping devices connecting said bridge-trees, the contiguous ends of the pulley-sections being spaced at their contiguous ends to provide openings for permitting adjustment of the pulley in its application to metallic shafts, whereby the pulley may be adjusted to compensate for contraction of a shaft, substantially as described.

8. A divided wood pulley consisting of complemental sections, bridge-trees fast with the respective sections and having transverse bolt-openings, headless clamping-bolts passing through said openings and having both ends thereof threaded, and nuts screwed on the opposite ends of each of the bolts, substantially as described.

In testimony that I claim the foregoing as my own I have hereto affixed my signature in the presence of two witnesses.

GEORGE P. BRUBAKER.

Witnesses:
 ROBT. M. WALKER,
 FRANK E. ZORN.